United States Patent [19]
O'Cheskey

[11] 3,774,802
[45] Nov. 27, 1973

[54] ATTACHMENT APPARATUS FOR PRESSURE VESSELS

[75] Inventor: Theodore H. O'Cheskey, Whittier, Calif.

[73] Assignee: United States Filter Corporation, Whittier, Calif.

[22] Filed: May 6, 1971

[21] Appl. No.: 140,740

[52] U.S. Cl............... 220/85 R, 220/63 R, 287/20, 287/23
[51] Int. Cl............................................ B65d 25/00
[58] Field of Search ............. 220/85 R, 85 B, 63 R; 156/91; 287/20, 23; 29/401

[56] References Cited
UNITED STATES PATENTS

| | | | |
|---|---|---|---|
| 1,564,809 | 12/1925 | Amend............................ | 220/63 R |
| 1,743,459 | 1/1930 | Kjekstad............................. | 220/71 |
| 2,721,580 | 10/1955 | Greer............................ | 220/63 R X |
| 2,746,637 | 5/1956 | Todd et al........................ | 220/63 R |
| 2,809,762 | 10/1957 | Cardona....................... | 220/63 R X |

FOREIGN PATENTS OR APPLICATIONS

| | | | |
|---|---|---|---|
| 916,166 | 1/1963 | Great Britain................... | 220/85 B |

Primary Examiner—Herbert F. Ross
Assistant Examiner—James R. Garrett
Attorney—Christie, Parker & Hale

[57] ABSTRACT

Apparatus for attaching internal parts to the interior of a pressure vessel having an inner lining of uncured rubber includes a rigid fastener, preferably an internally threaded nut, rigidly secured over an opening through the wall of the vessel and the rubber lining. A rigid bolt is threaded through the nut from the inside of the vessel so that a lateral shoulder on the bolt is tightened against the rubber lining. A layer of uncured rubber is mounted over the shoulder, and the layer is cured when the inner lining is being cured to embed the shoulder in the rubber and seal the bolt against leakage. Internal parts are attached to the portion of the bolt inside the vessel, and the structural load applied to the bolt by the internal parts is transmitted to the wall of the vessel through the rigid bolt and nut.

13 Claims, 3 Drawing Figures

Patented Nov. 27, 1973  3,774,802

INVENTOR.
THEODORE H. O'CHESKEY
BY
Christie, Parker & Hale
ATTORNEYS ically are constructed from carbon steel and are usually lined with rubber to resist corrosion of the liquids which are forced through them.

ATTACHMENT APPARATUS FOR PRESSURE VESSELS

BACKGROUND OF THE INVENTION

This invention relates to the mounting of internal parts to the interior of pressure vessels having an inner lining of elastomeric material such as rubber, and more particularly to mounting apparatus which transmits the load from the internal parts to the wall of the vessel through rigid structural members to prevent leakage through the wall of the vessel.

Pressure vessels used in the chemical industry generally are constructed from materials which resist various acids, alkalies, and organic solvents. For example, pressure vessels are constructed of stainless steel, copper and nickel alloys such as Monel, or titanium to achieve the chemical resistance required for a particular application. However, these materials are costly and more difficult to fabricate than carbon steel. Therefore, it has become common practice to build pressure vessels from carbon steel and line them with an elastomeric material such as rubber. The type of elastomer selected depends on its chemical compatibility with the process liquid in the pressure vessel. The elastomeric lining is applied to all wetted surfaces inside the vessel and acts as an impervious barrier to prevent the process liquid from contacting the carbon steel wall of the vessel. The liquid inside the vessel, which is under pressure, will penetrate even the smallest pinhole or crack in the lining and corrode the carbon steel wall of the vessel.

The interior of most pressure vessels includes internal parts such as piping for spray heads and the like. Prior art systems for attaching internal parts to the interior of rubber lined pressure vessels have been plagued with difficulties such as leakage and corrosion. Generally, internal parts are not attached to a clip or the like welded to the interior of the vessel, because it is difficult to obtain a good seal between the rubber lining and the welded clip. Moreover, most rubber lined vessels recently have included internal parts made of titanium alloys which are difficult to weld to carbon steel.

Several prior art attaching devices used in the chemical industry include bolts sealed through the wall of the pressure vessel, with internal parts being connected to the end of the bolt inside the vessel. One such prior art device includes a rubber sleeve-like grommet which is mounted in an opening through the wall of the vessel and the interior lining. A threaded bolt is mounted in the opening through the grommet, and threaded fasteners applied to the bolt on both sides of the grommet are tightened so the bolt is held tightly in the wall of the shell by the grommet.

In another mounting device the opening in the wall of the pressure vessel is filled with uncured rubber, and an oversized disk of uncured rubber is placed over the rubber plug on the outside of the vessel. The rubber plug, disk, and inner lining of the vessel are cured all at one time. A hole is then drilled in the center of the rubber plug, and a threaded bolt is mounted in the hole. Fasteners are then applied to both sides of the bolt and tightened so the bolt is held tightly in place in the wall of the shell by the rubber plug.

In use, these prior art mounting devices have shown a tendency to leak after certain periods of use. Leakage is a serious problem because it corrodes the wall of the pressure vessel, and can cause serious failure of the vessel when high pressures are applied.

This invention is based on the recognition that the prior art mounting devices leak because structural loads imposed on the mounting bolt by the internal parts are transmitted to the wall of the pressure vessel through the rubber in which the bolt is mounted. After a period of use the rubber tends to relax and the fluid inside the vessel leaks through the opening in the wall of the vessel.

SUMMARY OF THE INVENTION

This invention provides a method and apparatus for attaching internal parts to the interior of a pressure vessel so that loads imposed on the mounting bolt or connector are transmitted to the wall of the vessel through rigid structural parts. Thus, no load is transmitted to the lining of the vessel by the internal parts, thereby preventing leakage of the pressure vessel through the lining.

Briefly, the invention includes a pressure vessel having elastomeric material lining its inner wall surface. An elongated connector extends through an opening in the wall and the elastomeric lining, with the inner portion of the connector being adapted to mount internal parts such as piping, spray heads, and the like inside the vessel. A rigid fastener coupled to the outer portion of the connector holds the connector in a fixed position in the wall of the vessel. A seal is formed between the elastomeric lining and the inner portion of the connector to prevent leakage through the wall of the vessel. The fastener rigidly secures the connector to the wall of the vessel so that loads imposed on the connector by the internal parts aretransmitted are transmitted the wall through the rigid fastener and bolt assembly independent of the elastomeric lining. Thus, undue stress is not exerted on the lining which would otherwise cause the pressure vessel to leak.

BRIEF DESCRIPTION OF THE DRAWINGS

These and other aspects of the invention will be more fully understood by referring to the following detailed description and the accompanying drawings in which.

DETAILED DESCRIPTION OF THE PREFERRED EMBODIMENT

Figure 1:
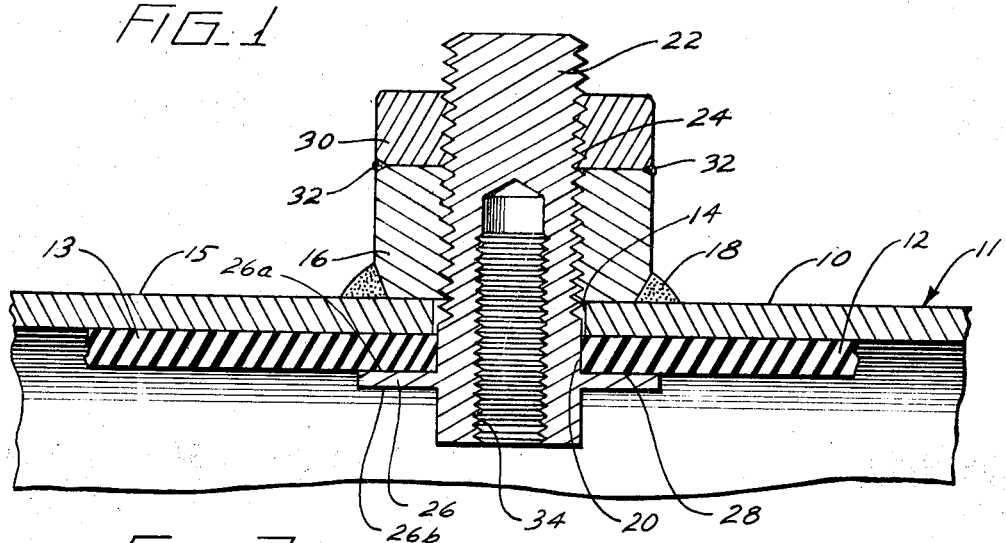
FIG. 1 is a fragmentary sectional elevation showing a preliminary step in installing a mounting device in the wall of a rubber lined pressure vessel.

Referring to FIG. 1, a wall 10 of a conventional pressure vessel or shell 11 used in the chemical industry has a lining 12 of a suitable elastomeric material covering its inner surface 13. A typical use of the pressure vessel is in the pressure filtration of liquids, where liquid to be filtered is forced through a cylindrical shell under high pressure. Pressure vessels typically are constructed of carbon steel and are usually lined with rubber to resist corrosion of the liquids which are forced through them.

For the purposes of this description it will be assumed that lining 12 is made of uncured or partially cured rubber. Natural rubber usually is used to line pressure vessels, although synthetic rubber can be used as long as it has the property of being fusible to a second layer of rubber to make a continuous bond to it.

An opening 14 is formed in wall 10 at a point where it is desired to attach fittings or internal parts, such as piping, spray heads, nozzles, and the like for the interior of the pressure vessel. A rigid internally threaded nut 16 is placed against an outer surface 15 of wall 10 and centered over opening 14. The nut is rigidly secured to the outer surface of the wall by a full fillet weld 18 extending around the base of the nut.

A layer 12 is then applied to inner surface 13 of wall 10. After inner lining 12 is applied, an opening 20 is cut through the lining concentric with opening 14. Opening 20 preferably is slightly smaller than opening 14 for a purpose described in detail below.

An elongated flanged bolt 22 is mounted in the wall of the pressure vessel to provide means for attaching internal parts to the interior of the shell. Bolt 22 has an externally threaded portion 24 at one end, and a flange or shoulder 26 projecting laterally outwardly from the body of the bolt near its other end. Flange 26 has an outer bearing surface 26a and an inner bearing surface 26b.

A layer 28 of bonding material, such as a conventional epoxy resin, rubber base glue, or the like, is applied to outer bearing surface 26a of flange 26. Externally threaded portion 24 of bolt 22 is then inserted through openings 20 and 14 from the inside of pressure vessel 11 and threaded through the internally threaded center of nut 16. Opening 20 in the rubber lining is cut to make a close fit around the shank of bolt 22 when the bolt is inserted in the opening. Bolt 22 is tightened in nut 16 so that the adhesive coated flange 26 lightly compresses the lining 12 of uncured rubber.

When the bolt is in place in the wall of the shell, the outer end of externally threaded portion 24 is exposed adjacent the outer surface of nut 16. The bolt is then held from turning and a lock nut 30 is threaded onto the outer end of the bolt and tightened against nut 16. Several tack welds 32 are applied between nut 30 and nut 16 to rigidly secure lock nut 30 against nut 16.

The inner end of bolt 22 has an internally threaded bore 34 (shown best in FIGS. 1 and 3) which is exposed to the interior of the pressure vessel and provides means for rigidly attaching internal parts to the interior of the vessel.

A disk 36 of uncured rubber is fitted over the inner end of bolt 22 so that it overlaps inner surface 26b of flange 26. The size of rubber disk 36 is such that an annular outer surface portion 38 of the disk provides a substantial area of contact between the disk and the inner surface of rubber lining 12 around the perimeter of flange 26. A layer 40 of suitable bonding material, such as epoxy resin or a rubber base glue, is applied to the disk 36 to bond it to the flange and rubber lining 12 so that the flange is completely sealed in rubber.

Figure 2:
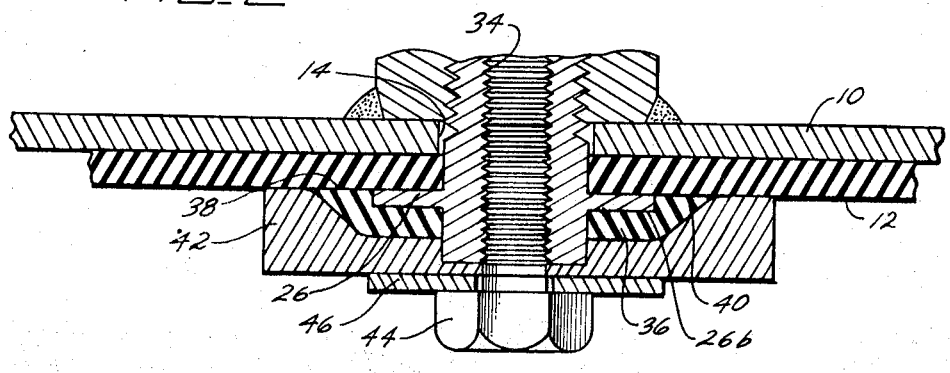
FIG. 2 is a fragmentary sectional elevation showing means for sealing the interior portion of the mounting device.

Rubber lining 12 and disk 36 are then prepared for curing by applying a mold cap 42 over the inner end of bolt 22. Release compound is applied to the bearing surface of the mold cap prior to its use. A temporary bolt 44 is inserted through the top of mold cap 42 and threaded into bore 34 of bolt 22. Bolt 44 is tightened against a temporary washer 46 mounted over the top of the mold cap to compress rubber disk 36 tightly over flange 26 and rubber lining 12. After the mold cap is in place as shown in FIG. 2, the uncured rubber lining 12 and disk 36 are then heated, the rubber lining and disk soften, become fused to each other, and cured to make a strong bond between them which embeds flange 26 in the rubber and provides a fluid-tight seal between bolt 22 and opening 14 through wall 10. The mold cap and temporary bolt 44 and washer 46 are removed after curing.

Figure 3:
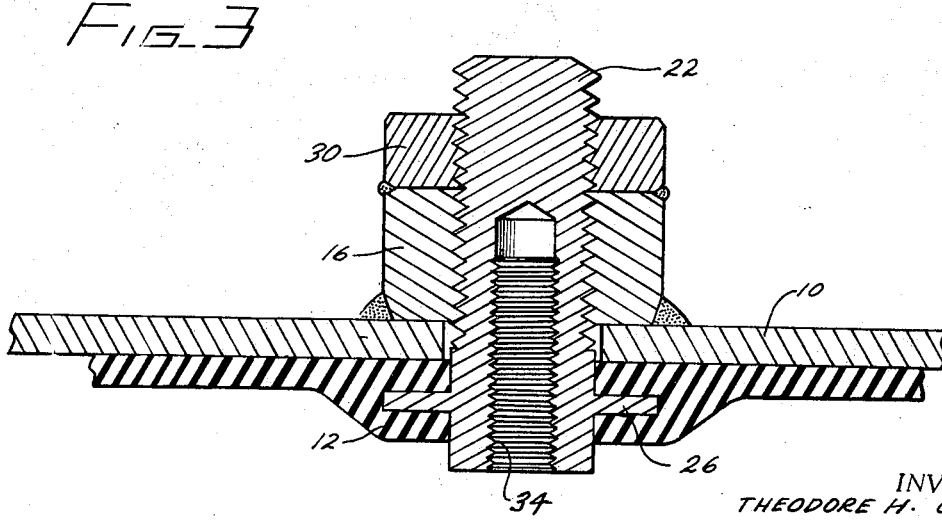
FIG. 3 is a fragmentary sectional elevation showing the mounting device in its completed form.

Leakage is prevented by the integral cured rubber lining 12 shown in FIG. 3 which is sealed around the inner portion of the bolt 12, with the flange 26 being embedded in the rubber. Various types of internal parts may be attached to threaded portion 34 of the bolt. Any load imposed by the internal parts is transmitted to the wall of the pressure vessel through rigid structural members only, namely, bolt 22 and nut 16. No load is imposed on rubber lining 12 by internal parts attached to bolt 22, which prevents the lining from deforming during use and leaking.

I claim:

1. Apparatus for attaching an article to the interior of a pressure vessel having a shell with an outer surface, an inner surface, and a layer of elastomeric material bonded to the inner surface and surrounding a hollow interior of the vessel, the apparatus including an elongated hollow rigid connector extending through an opening in the shell and in said elastomeric layer, the connector having an outer portion outside the shell and in inner portion extending through the elastomeric layer into the interior of the vessel, the portion of the connector in said hollow interior having means on it for holding said article in a fixed position inside the shell, rigid fastening means coupled to the outer portion of the connector and bonded to the outer surface of the shell to hold the connector in a fixed position in the wall of the shell, the outer portion of the connector being closed to prevent leakage from the interior of the shell through the connector, the elastomeric layer being fluid tightly bonded to the inner portion of the connector to provide a seal between the elastomeric layer and the inner portion of the connector to prevent leakage between them.

2. Apparatus according to claim 1 including a flange on the inner portion of the connector spaced inwardly from the inner surface of the shell and embedded in the elastomeric layer.

3. Apparatus according to claim 1 in which the elastomeric layer is made of rubber.

4. Apparatus according to claim 1 in which the connector has a threaded portion in the interior of the shell for holding said article in the shell.

5. Apparatus according to claim 1 in which the connector has a solid outer end portion which prevents leakage through the connector.

6. Apparatus according to claim 1 in which the rigid fastening means includes a metal threaded fastener welded to the outer wall of the shell.

7. Apparatus according to claim 6 in which the connector includes a portion threaded into the fastener.

8. Apparatus according to claim 1 including a rigid lock nut tightened against the fastener to lock the connector against rotation.

9. Apparatus according to claim 8 including means bonding the lock nut to the fastener.

10. Apparatus for attaching an article to the interior of a hollow filtration shell having an outside wall and a layer of rubber bonded to an inner surface thereof, the apparatus including an elongated hollow rigid bolt extending through apertures in the wall of the shell and the rubber layer, one end of the bolt having a threaded portion extending outside the shell, the other end of the bolt having a threaded portion extending inside the shell in communication with the hollow interior of the shell to provide means for holding said article in a fixed position inside the shell; a rigid threaded fastener threaded onto the outer portion of the bolt and bonded to the outer surface of the outside wall of the shell to hold the bolt in a fixed position in the wall of the shell, the outer portion of the bolt being closed to prevent leakage from the interior of the shell through the bolt, the rubber layer being bonded to the inner portion of the bolt to provide a seal between the layer and the bolt to prevent leakage through the wall of the shell; and a rigid lock nut tightened against the fastener to lock the bolt against rotation.

11. Apparatus according to claim 10 in which the bolt includes a flange extending laterally outwardly from the inner portion of the bolt, the flange being spaced inwardly from the inner surface of the outside wall of the shell and embedded in the rubber layer.

12. Apparatus according to claim 10 in which the bolt has a solid outer end portion which prevents leakage through the bolt.

13. Apparatus according to claim 10 including means bonding the lock nut to the fastener.

* * * * *